B. SPENCER.
COTTON SEED PLANTER.

No. 44,984.  Patented Nov. 8, 1864.

Witnesses:
F. Harper Day
C. M. Shedd

Inventor:
Basil Spencer
by his Atty
J. Franklin Reigart

UNITED STATES PATENT OFFICE.

BASIL SPENCER, OF LEWISBURG, PENNSYLVANIA.

COTTON-SEED PLANTER.

Specification forming part of Letters Patent No. 44,984, dated November 8, 1864.

*To all whom it may concern:*

Be it known that I, BASIL SPENCER, of Lewisburg, Union county, State of Pennsylvania, have invented new and useful Improvements in Cotton-Seed Planters; and I do hereby declare the following to be an exact description thereof, reference being had to the accompanying drawings, and to the letters of reference marked thereon, making a part of this specification.

Figure 2:
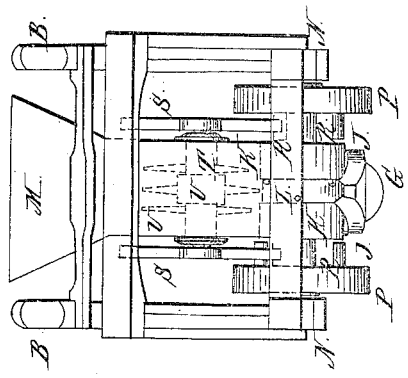
Figure 1:
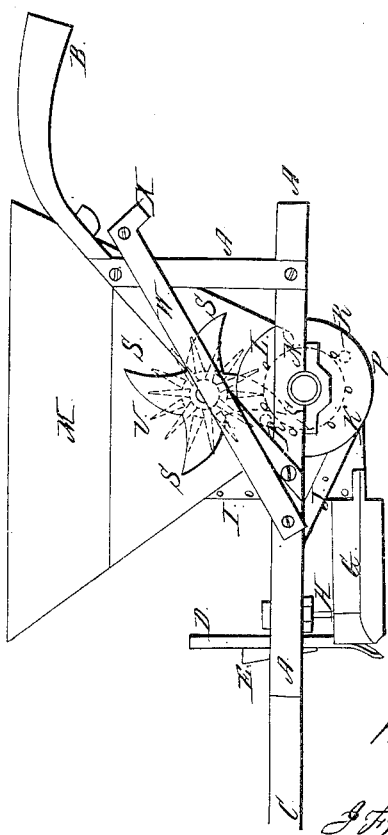

Figure 1 represents a side elevation; Fig. 2, a rear view.

The nature of my invention consists in the arrangement, construction, and combination of the colter with its opener, square seeding-trough with its scrapers, regulating seed-cylinder, outside ratchet-arms with inside stirrer, all as arranged and attached to a square frame, for the purpose of planting cotton-seed.

To enable others skilled in the art to make and use my invention, I will proceed to describe its construction and operation.

A represents a square frame, to which the handles B and seeding devices are attached; C, a center beam, to which one or two horses are intended to be attached. To this center beam, C, I have an adjustable colter, D, with a diamond-shaped point to cut the ground when hard, and when required to sow shallower it is raised and keyed fast by the wedge E, and the opener G opens the ground on each side and presses it smoothly in a V-shaped furrow. The opener G is of an oblong shape, bevel in front to the colter D, and beveled off to a sharp edge beneath. It is fastened to the beam C by a screw-bolt, H, and attached at its rear end to the square seeding-trough I. Curved scrapers J are permanently fastened to the beam C and the trough I, and curved in an ellipse under the cylinder K. This cylinder K has eight short pins, L, four at intermediate distances, set diagonally, to assist in dragging down the seeds from the hopper M through the trough I and depositing them in the V-shaped furrow beneath, when the seeds are covered by the curved scrapers J. The journals of the shaft of the cylinder K operate in boxes N on each side of the frame A, and the cylinder is revolved by wheels P on each side. These wheels P have two projecting pins, R, on their inside, set opposite to each other, which are brought in contact with four ratchet-arms, S, located on each side of hopper M, to revolve the arms. The arms S are attached to the ends of a shaft, T, that has six long pointed pins in the center and two on each side, forming a stirrer, U, that revolves in the lower part of the hopper M, so as to stir up the seeds, that they will drop down regularly into the trough I underneath and prevent the hopper from choking, the seeds passing through the square trough, though they had not been perfectly ginned before, thus keeping the seeds in constant agitation to drop and plant regularly. Movable side arms, W, with a square scraper, X, attached, are raised and lowered to assist in smoothing and covering the ground.

What I claim as my invention, and desire to secure by Letters Patent, is—

The arrangement, construction, and combination of the devices G, I, J, K, S, and U, as herein described, and for the purposes set forth.

BASIL SPENCER.

Witnesses:
J. FRANKLIN REIGART,
S. MORRIS.